US011894616B2

(12) United States Patent
Chen et al.

(10) Patent No.: US 11,894,616 B2
(45) Date of Patent: Feb. 6, 2024

(54) ANTENNA STRUCTURE

(71) Applicant: Quanta Computer Inc., Taoyuan (TW)

(72) Inventors: Chun-I Chen, Taoyuan (TW); Chun-Yuan Wang, Taoyuan (TW); Yu-Chen Zhao, Taoyuan (TW); Chung-Ting Hung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 65 days.

(21) Appl. No.: 17/677,440

(22) Filed: Feb. 22, 2022

(65) Prior Publication Data

US 2023/0223710 A1 Jul. 13, 2023

(30) Foreign Application Priority Data

Jan. 12, 2022 (TW) ................................ 111101212

(51) Int. Cl.
*H01Q 21/28* (2006.01)
*H01Q 9/04* (2006.01)

(52) U.S. Cl.
CPC ........... *H01Q 21/28* (2013.01); *H01Q 9/0414* (2013.01)

(58) Field of Classification Search
CPC ...... H01Q 21/28; H01Q 9/0414; H01Q 5/392; H01Q 1/2291; H01Q 1/243; H01Q 9/42
See application file for complete search history.

(56) References Cited

U.S. PATENT DOCUMENTS 10,446,915 B2 10/2019 Chen et al.
10,622,704 B2 * 4/2020 Hong .................... H01Q 5/357
2009/0058735 A1 * 3/2009 Hill ........................ H01Q 5/371 343/702
2018/0048076 A1 * 2/2018 Wei ........................ H01Q 1/243
2019/0198975 A1 * 6/2019 Chen ...................... H01Q 21/28
2021/0044000 A1 * 2/2021 Chang ...................... H01Q 1/38
2021/0126355 A1 * 4/2021 Chuang ................. H01Q 1/243
2022/0109250 A1 * 4/2022 Tsai ......................... H01Q 5/35

FOREIGN PATENT DOCUMENTS

TW M436234 U 8/2012
TW I671948 B 9/2019

OTHER PUBLICATIONS

Chinese language office action dated Jun. 30, 2022, issued in application No. TW 111101212.

* cited by examiner

*Primary Examiner* — Graham P Smith
*Assistant Examiner* — Michael M Bouizza
(74) *Attorney, Agent, or Firm* — McClure, Qualey & Rodack, LLP

(57) ABSTRACT

An antenna structure includes a first radiation element, a second radiation element, a third radiation element, a fourth radiation element, a fifth radiation element, and a dielectric substrate. The first radiation element has a feeding point. The second radiation element is coupled to the first radiation element. The third radiation element is coupled to a first grounding point. The third radiation element is further coupled through the fourth radiation element to a second grounding point. The fifth radiation element is coupled to the third radiation element and the fourth radiation element. The fifth radiation element is adjacent to the second radiation element. The first radiation element and the second radiation element are at least partially surrounded by the third radiation element, the fourth radiation element, and the fifth radiation element.

7 Claims, 3 Drawing Sheets

300

ANTENNA STRUCTURE

CROSS REFERENCE TO RELATED APPLICATIONS

This application claims priority of Taiwan Patent Application No. 111101212 filed on Jan. 12, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient bandwidth, it will degrade the communication quality of the relative mobile device. Accordingly, it has become a critical challenge for antenna designers to design a small-size, wideband antenna structure.

BRIEF SUMMARY OF THE INVENTION

In an exemplary embodiment, the invention is directed to an antenna structure that includes a first radiation element, a second radiation element, a third radiation element, a fourth radiation element, a fifth radiation element, and a dielectric substrate. The first radiation element has a feeding point. The second radiation element is coupled to the first radiation element. The third radiation element is coupled to a first grounding point. The third radiation element is further coupled through the fourth radiation element to a second grounding point. The fifth radiation element is coupled to the third radiation element and the fourth radiation element. The fifth radiation element is adjacent to the second radiation element. The first radiation element, the second radiation element, the third radiation element, the fourth radiation element, and the fifth radiation element are all disposed on the dielectric substrate. The first radiation element and the second radiation element are at least partially surrounded by the third radiation element, the fourth radiation element, and the fifth radiation element.

In some embodiments, the combination of the first radiation element and the second radiation element substantially has an L-shape.

In some embodiments, the third radiation element and the fourth radiation element are configured to prevent environmental factors from negatively affecting the radiation performance of the antenna structure.

In some embodiments, the fourth radiation element further has a hollow portion.

In some embodiments, the antenna structure further includes a sixth radiation element coupled to the first radiation element. The sixth radiation element and the second radiation element substantially extend in opposite directions.

In some embodiments, the antenna structure further includes a seventh radiation element coupled to the third radiation element. The seventh radiation element is adjacent to the sixth radiation element.

In some embodiments, the antenna structure covers a first frequency band, a second frequency band, and a third frequency band. The first frequency band is from 700 MHz to 900 MHz. The second frequency band is from 1700 MHz to 2200 MHz. The third frequency band is from 2500 MHz to 2700 MHz.

In some embodiments, the total length of the first radiation element and the second radiation element is substantially equal to 0.25 wavelength of the second frequency band.

In some embodiments, the total length of the third radiation element and the fourth radiation element is substantially equal to 0.5 wavelength of the first frequency band.

In some embodiments, the total length of the third radiation element and the fifth radiation element is substantially equal to 1.5 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
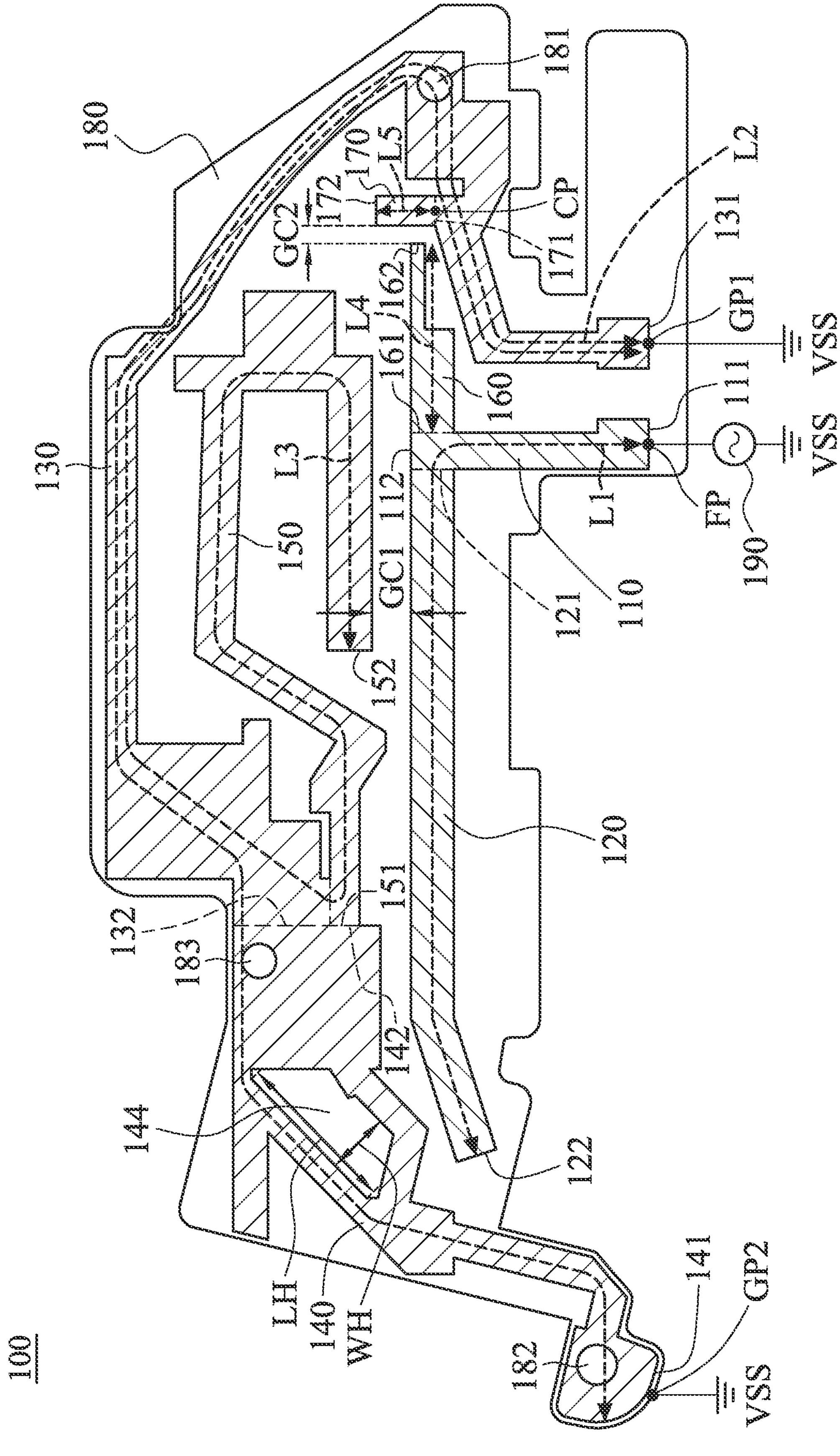
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. The antenna structure 100 may be applied to a mobile device, such as a smartphone, a tablet computer, a notebook computer, a wireless access point, a router, or any device for communication. Alternatively, the antenna structure 100 may be applied to an electronic device, such as any unit operating within the IOT (Internet of Things).

As shown in FIG. 1, the antenna structure 100 at least includes a first radiation element 110, a second radiation element 120, a third radiation element 130, a fourth radiation element 140, a fifth radiation element 150, and a dielectric substrate 180. The first radiation element 110, the second radiation element 120, the third radiation element 130, the fourth radiation element 140, and the fifth radiation element 150 may all be made of metal materials, such as copper, silver, aluminum, iron, or their alloys.

The first radiation element 110 may substantially have a straight-line shape. Specifically, the first radiation element 110 has a first end 111 and a second end 112. A feeding point FP is positioned at the first end 111 of the first radiation element 110. The feeding point FP may be further coupled to a signal source 190. For example, the signal source 190 may be an RF (Radio Frequency) module for exciting the antenna structure 100.

The second radiation element 120 may substantially have a relatively long straight-line shape, and it may be substantially perpendicular to the first radiation element 110. For example, the combination of the first radiation element 110 and the second radiation element 120 may substantially have an L-shape. Specifically, the second radiation element 120 has a first end 121 and a second end 122. The first end 121 of the second radiation element 120 is coupled to the second end 112 of the first radiation element 110. The second end 122 of the second radiation element 120 is an open end.

The third radiation element 130 may substantially have a meandering shape. Specifically, the third radiation element 130 has a first end 131 and a second end 132. The first end 131 of the third radiation element 130 is coupled to a first grounding point GP1. The first grounding point GP1 may be further coupled to a ground voltage VSS. For example, the ground voltage VSS may be provided by a system ground plane (not shown).

The fourth radiation element 140 may substantially have another meandering shape. Specifically, the fourth radiation element 140 has a first end 141 and a second end 142. The first end 141 of the fourth radiation element 140 is coupled to a second grounding point GP2. The second end 142 of the fourth radiation element 140 is coupled to the second end 132 of the third radiation element 130. That is, the third radiation element 130 is coupled through the fourth radiation element 140 to the second grounding point GP2. The second grounding point GP2 may be further coupled to the ground voltage VSS. In some embodiments, the fourth radiation element 140 further has a hollow portion 144. For example, the hollow portion 144 of the fourth radiation element 140 may substantially has a trapezoidal shape or a semi-circular shape, but it is not limited thereto.

The fifth radiation element 150 may substantially have a U-shape. Specifically, the fifth radiation element 150 has a first end 151 and a second end 152. The first end 151 of the fifth radiation element 150 is coupled to the second end 132 of the third radiation element 130 and the second end 142 of the fourth radiation element 140. The second end 152 of the fifth radiation element 150 is an open end. For example, the second end 152 of the fifth radiation element 150 and the second end 122 of the second radiation element 120 may substantially extend in the same direction. The fifth radiation element 150 is adjacent to the second radiation element 120. It should be noted that the term "adjacent" or "close" over the disclosure means that the distance (spacing) between two corresponding elements is smaller than a predetermined distance (e.g., 5 mm or the shorter), but often does not mean that the two corresponding elements directly touch each other (i.e., the aforementioned distance/spacing between them is reduced to 0). In some embodiments, a first coupling gap GC1 is formed between the fifth radiation element 150 and the second radiation element 120. It should be noted that the first radiation element 110 and the second radiation element 120 are at least partially surrounded by the third radiation element 130, the fourth radiation element 140, and the fifth radiation element 150.

In some embodiments, the antenna structure 100 further includes a sixth radiation element 160, which may be made of a metal material. The sixth radiation element 160 may substantially have a variable-width straight-line shape. Specifically, the sixth radiation element 160 has a first end 161 and a second end 162. The first end 161 of the sixth radiation element 160 is coupled to the second end 112 of the first radiation element 110. The second end 162 of the sixth radiation element 160 is an open end. For example, the second end 162 of the sixth radiation element 160 and the second end 122 of the second radiation element 120 may substantially extend in opposite directions and away from each other. In some embodiments, the combination of the first radiation element 110, the second radiation element 120, and the sixth radiation element 160 substantially has a T-shape. It should be understood that the sixth radiation element 160 is merely an optional component, which is omitted in other embodiments.

In some embodiments, the antenna structure 100 further includes a seventh radiation element 170, which may be made of a metal material. The seventh radiation element 170 may substantially have a relatively short straight-line shape. Specifically, the seventh radiation element 170 has a first end 171 and a second end 172. The first end 171 of the seventh radiation element 170 is coupled to a connection point CP on the third radiation element 130. The second end 172 of the seventh radiation element 170 is an open end. For example, the seventh radiation element 170 may be adjacent to the sixth radiation element 160, and may be substantially perpendicular to the sixth radiation element 160. In some embodiments, a second coupling gap GC2 is formed between the seventh radiation element 170 and the sixth radiation element 160. It should be understood that the seventh radiation element 170 is merely another optional component, which is omitted in other embodiments.

In some embodiments, the third radiation element 130 further has a first opening 181, which is adjacent to the seventh radiation element 170. In some embodiments, the fourth radiation element 140 further has a second opening 182 and a third opening 183. The second opening 182 is adjacent to the first end 141 of the fourth radiation element 140. The third opening 183 is adjacent to the second end 142 of the fourth radiation element 140. For example, each of the first opening 181, the second opening 182, and the third opening 183 may substantially have a circular shape, a square shape, or a regular triangle, but it is not limited thereto. In some embodiments, the third radiation element 130 and the fourth radiation element 140 are fixed on the dielectric substrate 180 by using the first opening 181, the second opening 182, and the third opening 183. However, the invention is not limited thereto. In alternative embodiments, the first opening 181, the second opening 182, and the third opening 183 are filled with metal materials.

The dielectric substrate 180 may be an FR4 (Flame Retardant 4) substrate, a PCB (Printed Circuit Board), or an FPC (Flexible Circuit Board). The first radiation element 110, the second radiation element 120, the third radiation element 130, the fourth radiation element 140, the fifth radiation element 150, the sixth radiation element 160, and the seventh radiation element 170 may be disposed on the same surface of the dielectric substrate 180, and thus the antenna structure 100 can be a planar antenna structure. However, the invention is not limited thereto. In alternative embodiments, the first radiation element 110, the second radiation element 120, the third radiation element 130, the fourth radiation element 140, the fifth radiation element 150, the sixth radiation element 160, and the seventh radiation element 170 may be disposed on different surfaces of the dielectric substrate 180, thereby forming a 3D (Three-Dimensional) antenna structure.

Figure 2:
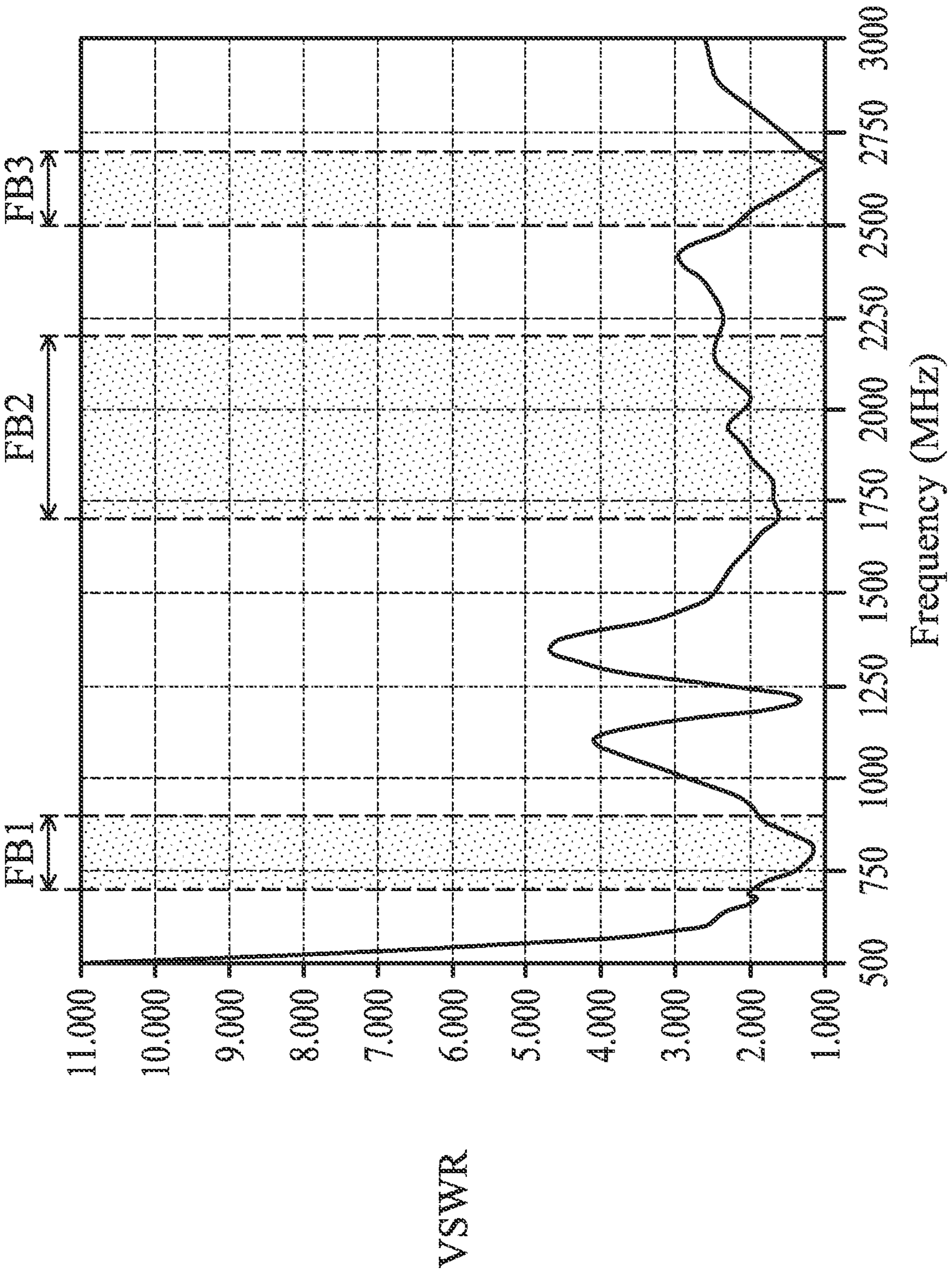
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. The first frequency band FB1 may be from 700 MHz to 900 MHz. The second frequency band FB2 may be from 1700 MHz to 2200 MHz. The third frequency band FB3 may be from 2500 MHz to 2700 MHz. Therefore, the antenna structure 100 can support at least the wideband operations of LTE (Long Term Evolution).

In some embodiments, the operational principles of the antenna structure 100 will be described as follows. The first radiation element 110 and the second radiation element 120 are excited to generate the second frequency band FB2. The third radiation element 130 and the fourth radiation element 140 are excited by the first radiation element 110 and the second radiation element 120 using a coupling mechanism, so as to form the first frequency band FB1. The third radiation element 130 and the fifth radiation element 150 are excited by the first radiation element 110 and the second radiation element 120 using another coupling mechanism, so as to form the third frequency band FB3. According to practical measurements, the third radiation element 130 and the fourth radiation element 140 are configured to prevent environmental factors (e.g., a nearby metal component) from negatively affecting the radiation performance of the antenna structure 100. Furthermore, the hollow portion 144 of the fourth radiation element 140 can provide additional current paths, thereby increasing the operational bandwidth of the first frequency band FB1. It should be noted that since all radiation elements corresponding to the LTE communication are integrated in the single antenna structure 100, the whole size of the antenna structure 100 can be significantly reduced.

In some embodiments, the element sizes of the antenna structure 100 will be described as follows. The total length L1 of the first radiation element 110 and the second radiation element 120 may be substantially equal to 0.25 (λ/4) wavelength of the second frequency band FB2 of the antenna structure 100. The total length L2 of the third radiation element 130 and the fourth radiation element 140 may be substantially equal to 0.5 (λ/2) wavelength of the first frequency band FB1 of the antenna structure 100. The total length L3 of the third radiation element 130 and the fifth radiation element 150 may be substantially equal to 1.5 (3λ/2) wavelength of the third frequency band FB3 of the antenna structure 100, or may be substantially equal to 0.5 (λ/2) wavelength of the first frequency band FB1 of the antenna structure 100. The length L4 of the sixth radiation element 160 may be from 5 mm to 15 mm. The length L5 of the seventh radiation element 170 may be from 3 mm to 7 mm. Among the fourth radiation element 140, the length LH of the hollow portion 144 may be from 10 mm to 14 mm, and the width WH of the hollow portion 144 may be from 3 mm to 7 mm. The above ranges of element sizes and parameters are calculated and obtained according to many experiment results, and they help to optimize the operational bandwidth and impedance matching of the antenna structure 100.

Figure 3:
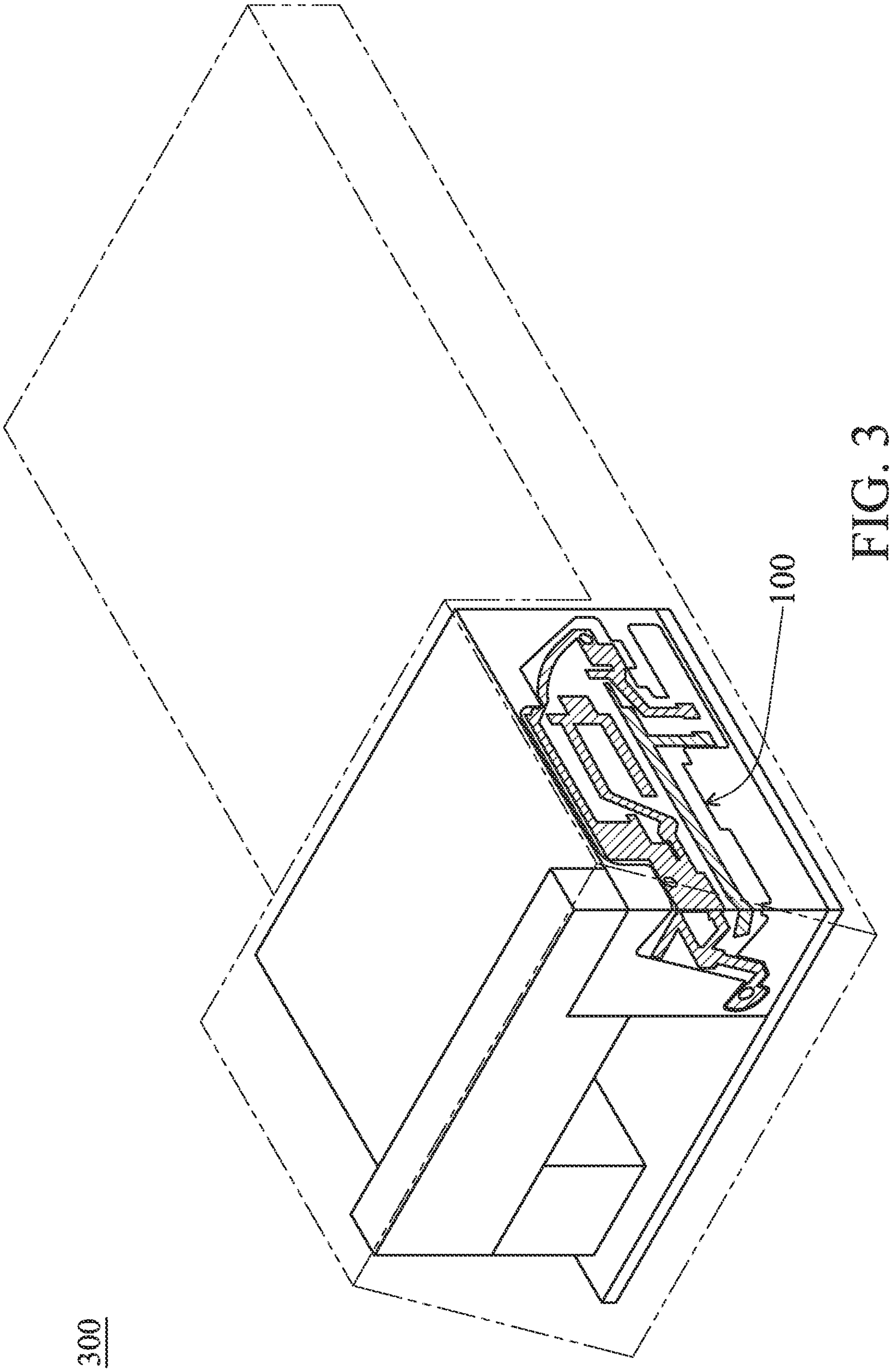
FIG. 3 is a diagram of a POS (Point of Sale) system according to an embodiment of the invention.

FIG. 3 is a diagram of a POS (Point of Sale) system 300 according to an embodiment of the invention. In the embodiment of FIG. 3, the POS system 300 includes the aforementioned antenna structure 100, and thus the POS system 300 supports the function of wireless communication. In some embodiments, the POS system 300 further includes an RF circuit, a filter, an amplifier, a processor, and/or a housing, but it is not limited thereto. It should be noted that the 3D structure of the antenna structure 100 is adjustable according to the style of the POS system 300, without affecting the communication quality thereof. Other features of the POS system 300 of FIG. 3 are similar to those of the antenna structure 100 of FIG. 1. Therefore, the two embodiments can achieve similar levels of performance.

The invention proposes a novel antenna structure. In comparison to the conventional design, the invention has at least the advantages of small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-3. The invention may merely include any one or more features of any one or more embodiments of FIGS. 1-3. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a first radiation element, having a feeding point;

a second radiation element, coupled to the first radiation element;

a third radiation element, coupled to a first grounding point;

a fourth radiation element, wherein the third radiation element is further coupled through the fourth radiation element to a second grounding point;

a fifth radiation element, coupled to the third radiation element and the fourth radiation element, wherein the fifth radiation element is adjacent to the second radiation element; and a dielectric substrate, wherein the first radiation element, the second radiation element, the third radiation element, the fourth radiation element, and the fifth radiation element are disposed on the dielectric substrate;

wherein the first radiation element and the second radiation element are at least partially surrounded by the third radiation element, the fourth radiation element, and the fifth radiation element;

wherein the antenna structure covers a first frequency band, a second frequency band, and a third frequency band, the first frequency band is from 700 MHz to 900 MHz, the second frequency band is from 1700 MHz to 2200 MHz, and the third frequency band is from 2500 MHz to 2700 MHz;

wherein a total length of the first radiation element and the second radiation element is substantially equal to 0.25 wavelength of the second frequency band wherein the fourth radiation element further has a hollow portion;

wherein the hollow portion substantially has a trapezoidal shape with a width from 3 mm to 7 mm.

2. The antenna structure as claimed in claim 1, wherein a combination of the first radiation element and the second radiation element substantially has an L-shape.

3. The antenna structure as claimed in claim 1, wherein the third radiation element and the fourth radiation element are configured to prevent environmental factors from negatively affecting radiation performance of the antenna structure.

4. The antenna structure as claimed in claim 1, further comprising:

a sixth radiation element, coupled to the first radiation element, wherein the sixth radiation element and the second radiation element substantially extend in opposite directions.

5. The antenna structure as claimed in claim 4, further comprising:

a seventh radiation element, coupled to the third radiation element, wherein the seventh radiation element is adjacent to the sixth radiation element.

6. The antenna structure as claimed in claim 1, wherein a total length of the third radiation element and the fourth radiation element is substantially equal to 0.5 wavelength of the first frequency band.

7. The antenna structure as claimed in claim 1, wherein a total length of the third radiation element and the fifth radiation element is substantially equal to 1.5 wavelength of the third frequency band.

* * * * *